Feb. 16, 1965   R. M. RUNYAN   3,169,780
DOLLY DEVICE
Filed Aug. 21, 1961   2 Sheets-Sheet 2
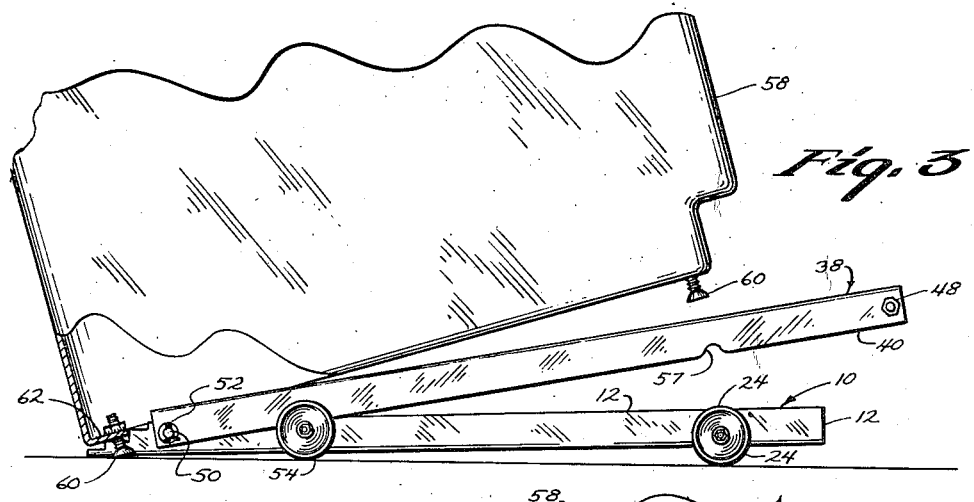
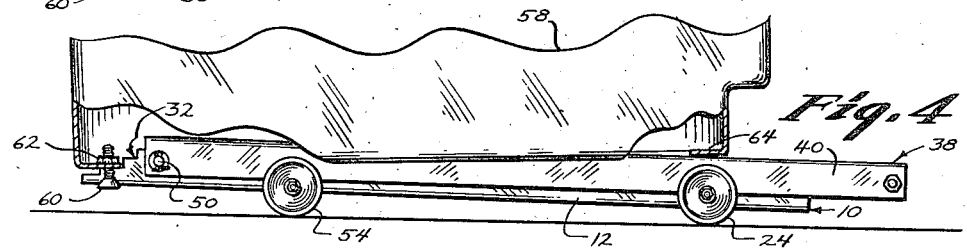
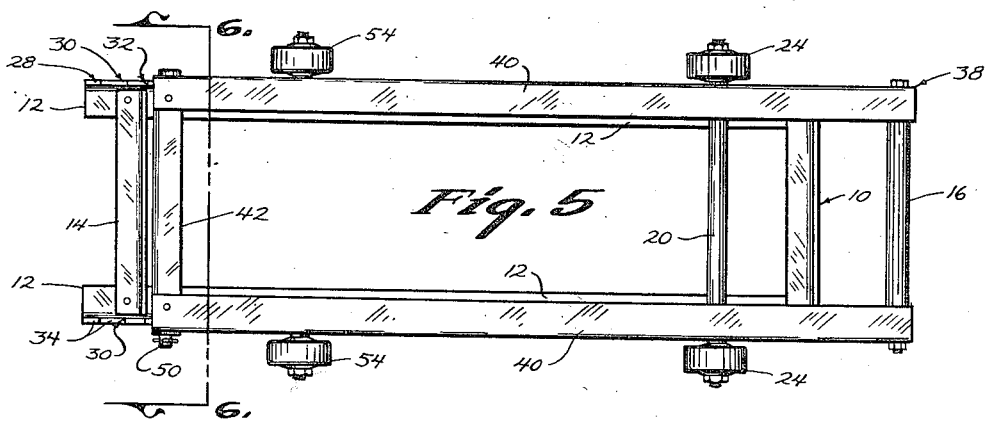
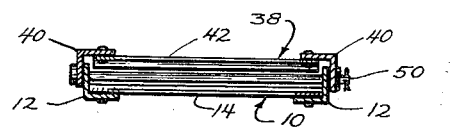
INVENTOR.
RAY M. RUNYAN
BY
WITNESS
NORMAN G. TRAVISS
ATTORNEYS

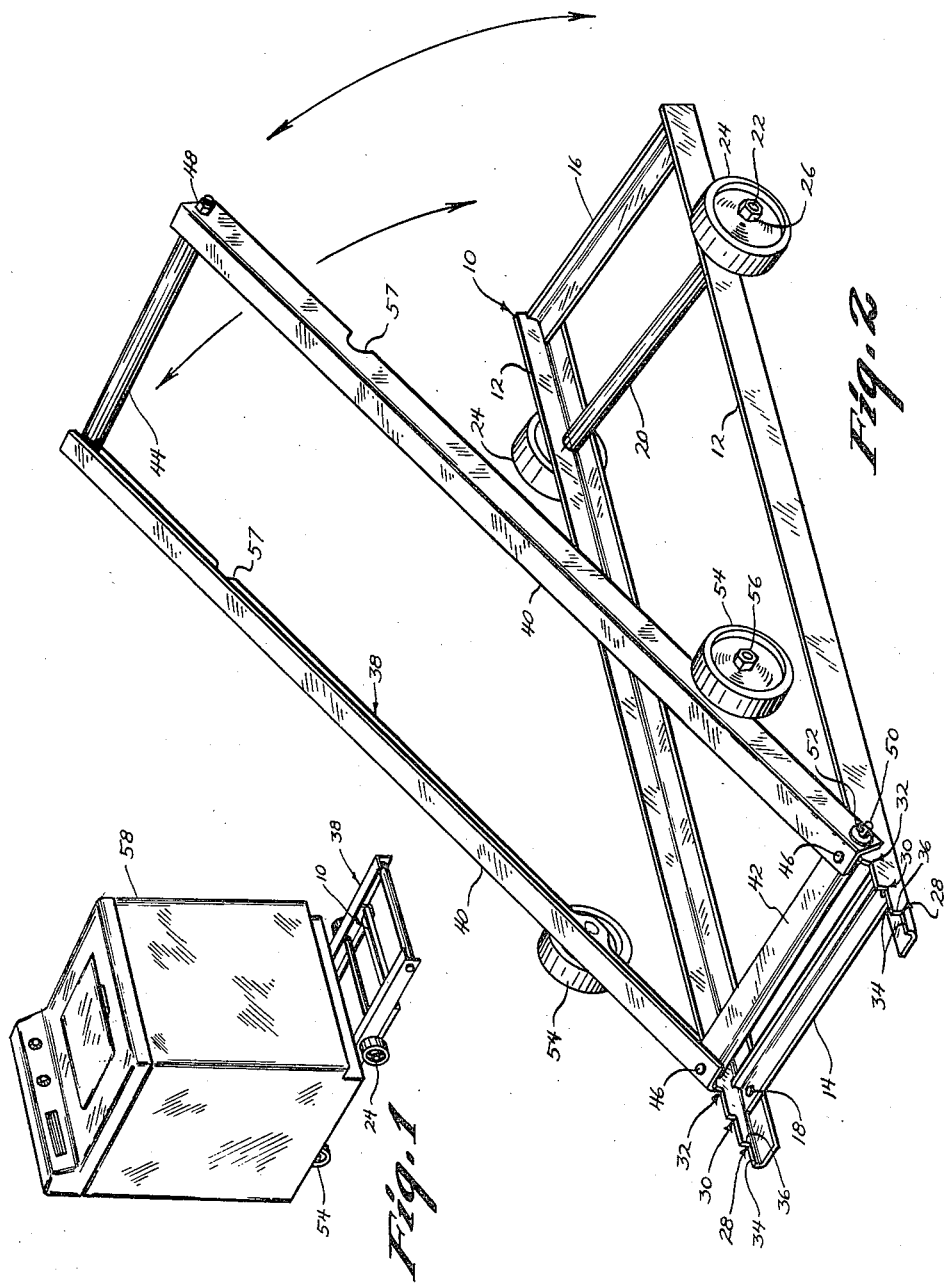

United States Patent Office

3,169,780
Patented Feb. 16, 1965

3,169,780
DOLLY DEVICE
Ray M. Runyan, Bondurant, Iowa
Filed Aug. 21, 1961, Ser. No. 132,848
4 Claims. (Cl. 280—43)

My invention relates to wheel-mounted equipment for moving heavy objects and particularly relates to a dolly that is adapted to support appliances such as stoves, washing machines, dryers, and the like.

The manual handling of appliances and the like is particularly troublesome to the appliance dealer and serviceman because the size and weight of most kitchen appliances prevent lifting thereof by a single person. As a result, the appliances are often moved by sliding them across the floor surface which is in itself a difficult task and which may be injurious to the floor. My device relates to a structure designed to overcome the difficulties formerly encountered in moving such heavy and combersome objects.

The principal object of my invention is to provide a dolly device that utilizes the weight of the object being lifted to elevate the object from an immobile position on the floor to a mobile position on the dolly.

A further object of my invention is to provide a dolly device that can normally be operated by one person.

A still further object of my invention is to provide a dolly device that will not tend to move while the weight of the object being lifted descends on the dolly.

A still further object of my invention is to provide a dolly device that is easily carried while not in use.

A still further object of my invention is to provide a dolly device that can accommodate irregularities in the bottom surface of the object being lifted without affecting the balance of the object on the dolly.

A still further object of my invention is to provide a dolly device that is economical of manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a partial perspective view of my device with an appliance mounted thereon;

FIG. 2 is a perspective view of my device with the upper frame pivoted upwardly with respect to the lower frame;

FIG. 3 is a side elevational view of my device as it is being introduced underneath a tilted appliance;

FIG. 4 is a side elevational view of an appliance mounted on my device;

FIG. 5 is a plan view of my device; and

FIG. 6 is a sectional view of my device taken on line 6—6 of FIG. 5.

I have used the numeral 10 to generally designate a lower frame which is comprised of two side angle members 12, forward cross member 14 and rearward cross member 16. The frame 10 is generally rectangular in shape although forward cross member 14 is located slightly to the rear of the forward ends of side members 12. The components of frame 10 can be secured together by rivets 18 or in any other convenient manner. A hollow bearing shaft 20 is welded or otherwise secured by its ends to side members 12 and is adapted to rotatably receive axle 22. Wheels 24 are secured to the ends of axle 22 adjacent the outer edges of side members 12 by means of nut elements 26. The forward ends of side members 12 have a plurality of notches 28, 30 and 32 which are each comprised of horizontal portions 34 and vertical portions 36. The elevation of the horizontal portions 34 of the successive notches increases so that the horizontal portion of the forwardmost notch 28 is lower than the corresponding portions of notches 30 and 32.

An upper frame 38 is comprised of side angle members 40, forward cross member 42 and rearward sleeve member 44. Frame 38 is generally rectangular in shape and the side angle members 40 are inverted with respect to the side angle members 12 of frame 10 so that the side angle members of the two frames can assume an overlapping position at times as shown in FIG. 6. Cross member 42 is secured to side angle member 40 by rivets 46 and sleeve member 44 is connected to these angle members by bolt and nut assembly 48 which draws the side angles against the ends of the sleeve member.

Frame 38 is hinged to the forward end of frame 10 just rearwardly of notch 32 by means of pin 50 which extends through registering apertures in the frames. Cotter key 52 maintains the position of pin 50 with respect to the frames 10 and 38. Wheels 54 are mounted on stud shafts 56 which extend outwardly from the sides of frame 38 at a point just rearwardly of the forward end of frame 38. Arcuate notches 57 on the lower edges of side angle member 40 are adapted to engage and receive the shaft 22 on frame 10 when the frame 38 dwells in folded condition on top of frame 10. As shown in FIG. 6, the inside width of frame 38 is substantially the same as the outside width of frame 10. It will also be noted that the rearward end of frame 38 extends rearwardly beyond the corresponding end of frame 10.

The normal operation of my device is as follows: An appliance 58 having adjustable legs 60, a rearward frame flange 62 and forward frame flange 64, can be tilted rearwardly as shown in FIG. 3 so that it is completely supported on its rearmost legs. The frame 38 of my device is pivoted slightly upwardly with respect to frame 10 as the two frames are moved to a position underneath the appliance. As shown in FIG. 3, the vertical portion 36 of notch 30 can abut the flange 62 of the appliance and the horizontal portion 34 of this notch can move under the flange. If the clearance below flange 62 had been smaller, notch 28 would have received the flange, and conversely, if the clearance had been greater, notch 32 would have received the flange. While in the position of FIG. 3, the forward end of frame 10 can engage the floor or supporting surface and the wheels 54 do not need to touch the floor and do not need to provide any support for the unit.

The appliance is thereupon lowered to a horizontal position and it thereby forces upper frame 38 to pivot downwardly to a position on top of lower frame 10, as shown in FIG. 4. The downward movement of upper frame 38 forces wheels 54 into engagement with the floor. With the wheels 54 acting as a pivot point, upper frame 38 acting as a lever, and the appliance 58 exerting a force downwardly on frame 38, the forward ends of the frames 10 and 38 pivot upwardly with respect to wheels 54 and the appliance thereupon becomes fully supported by the four wheels on the frame. The notch 30 performs a vital function during this operation for it provides a horizontal surface upon which the appliance can exert a vertically downward force. If, for example, the forward end of the frame 10 were tapered underneath appliance flange 62, the weight of the appliance during the downward pivotal movement would tend to push the dolly in a rearward direction.

The open space in the center of the two frames allows some projections from the appliance to extend downwardly below the level of the frame flanges 62 and 64 without affecting the balance of the appliance on the dolly. The folded overlapping position of the frames 10 and 38 in FIG. 6 present a strong unitary structure to support the appliance for movement on the floor surface after it has been mounted on the dolly in the manner described. It is therefore seen that my device will accomplish at least all of its stated objectives.

Some changes may be made in the construction and arrangement of my dolly device without departing from the real spirit and purpose of my invention, and it is my intention to cover by my claims, any modified forms of structure or use of mechanical equivalents which may be reasonably included within their scope.

I claim:

1. In a dolly device,
   a lower frame having forward and rearward ends,
   an upper frame having forward and rearward ends pivotally secured by its forward end to the forward end of said lower frame and being adapted to assume a folded condition on top of said lower frame at times,
   said upper and lower frames being of flat construction to permit them to be folded upon each other in a horizontal plane,
   wheels on opposite sides of said upper frame near its forward end,
   and wheels on opposite sides of said lower frame near its rearward end to facilitate the insertion thereof underneath an appliance and to permit such appliance to be supported on said wheels when said frames are folded upon each other.

2. In a dolly device for an appliance or the like,
   a lower frame having forward and rearward ends,
   an upper frame having forward and rearward ends pivotally secured by its forward end to the forward end of said lower frame and being adapted to assume a folded condition on top of said lower frame at times,
   said upper and lower frames being of flat construction to permit them to be folded upon each other in a horizontal plane,
   at least one notch on the forward end of at least one of said frames,
   said notch adapted to engage the bottom of said appliance at times,
   wheels on opposite sides of said upper frame near its forward end,
   and wheels on opposite sides of said lower frame near its rearward end to facilitate the insertion thereof underneath an appliance and to permit such appliance to be supported on said wheels when said frames are folded upon each other.

3. In a dolly device,
   a substantially horizontal lower frame having forward and rearward ends,
   an upper frame having forward and rearward ends pivotally secured by its forward end to the forward end of said lower frame and being adapted to assume a folded condition on top of said lower frame at times,
   said upper and lower frames being of flat construction to permit them to be folded upon each other in a horizontal plane,
   wheels on opposite sides of said lower frame near its rearward end,
   and wheels on opposite sides of said upper frame near its forward end; said wheels on said upper frame having a portion thereof extending below said lower frame when said upper frame is in a folded condition on top of said lower frame,
   said wheels and said foldable upper and lower frames serving to facilitate the insertion thereof underneath an appliance and to permit such appliance to be supported on said wheels when said frames are folded upon each other.

4. In a dolly device for an appliance or the like,
   a substantially horizontal lower frame having forward and rearward ends,
   an upper frame having forward and rearward ends pivotally secured by its forward end to the forward end of said lower frame and being adapted to assume a folded condition on top of said lower frame at times,
   said upper and lower frames being of flat construction to permit them to be folded upon each other in a horizontal plane,
   wheels on opposite sides of said lower frame near its rearward end,
   wheels on opposite sides of said upper frame near its forward end; said wheels on said upper frame having a portion thereof extending below said lower frame when said upper frame is in a folded condition on top of said lower frame,
   said wheels and said foldable upper and lower frames serving to facilitate the insertion thereof underneath an appliance and to permit such appliance to be supported on said wheels when said frames are folded upon each other,
   and a plurality of notches on the forward end of at least one of said frames, said notches each presenting a horizontal supporting surface adapted to engage the bottom of said appliance at times, the horizontal supporting surface of different notches being at different elevations when said frames are in said folded condition.

References Cited by the Examiner

UNITED STATES PATENTS

| | | | |
|---|---|---|---|
| 466,899 | 1/92 | Bourell | 280—30 |
| 867,754 | 10/07 | Randall | 280—30 |
| 1,555,197 | 9/25 | Fritz | 280—47.29 |
| 1,924,885 | 8/33 | Schreck | 280—47.34 X |
| 2,696,928 | 12/54 | Faircloth et al. | 280—79.1 |
| 2,878,884 | 3/59 | Schreck | 180—13 |
| 2,962,105 | 11/60 | Simbulan | 180—13 |

FOREIGN PATENTS 1,005,675  12/51  France.

A. HARRY LEVY, *Primary Examiner.*

GEORGE HYMAN, Jr., PHILIP ARNOLD, *Examiners.*